(12) United States Patent
Thakkilapati et al.

(10) Patent No.: US 11,269,536 B2
(45) Date of Patent: Mar. 8, 2022

(54) METHOD AND SYSTEM FOR EFFICIENT CONTENT TRANSFER TO DISTRIBUTED STORES

(71) Applicants: Nagaraja Thakkilapati, Bangalore (IN); Sekhar Venkatesan, Bangalore (IN); Sumeet Mishra, Bangalore (IN)

(72) Inventors: Nagaraja Thakkilapati, Bangalore (IN); Sekhar Venkatesan, Bangalore (IN); Sumeet Mishra, Bangalore (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 84 days.

(21) Appl. No.: 16/586,581

(22) Filed: Sep. 27, 2019

(65) Prior Publication Data

US 2021/0096759 A1 Apr. 1, 2021

(51) Int. Cl.
*G06F 3/06* (2006.01)
*G06F 16/182* (2019.01)
*G06F 9/38* (2018.01)

(52) U.S. Cl.
CPC ............ *G06F 3/0646* (2013.01); *G06F 3/064* (2013.01); *G06F 3/067* (2013.01); *G06F 3/0619* (2013.01); *G06F 9/3851* (2013.01); *G06F 16/182* (2019.01)

(58) Field of Classification Search
CPC .... G06F 3/0646; G06F 16/182; G06F 3/0619; G06F 3/064; G06F 3/067
See application file for complete search history.

(56) References Cited

U.S. PATENT DOCUMENTS

| | | | | |
|---|---|---|---|---|
| 8,473,585 | B1* | 6/2013 | Smith | H04L 67/1097 709/219 |
| 8,966,014 | B2* | 2/2015 | Park | H04L 65/4084 709/219 |
| 11,010,400 | B1* | 5/2021 | Jain | G06F 3/0643 |
| 11,082,495 | B1 | 8/2021 | Vidudala | |
| 2008/0168460 | A1* | 7/2008 | Lee | G06F 13/24 718/104 |
| 2008/0298363 | A1* | 12/2008 | Ban | H04L 49/90 370/390 |
| 2010/0268902 | A1 | 10/2010 | Drobychev et al. | |
| 2012/0089775 | A1* | 4/2012 | Ranade | G06F 16/1744 711/113 |

(Continued)

OTHER PUBLICATIONS

Office Action for U.S. Appl. No. 16/842,090, dated Oct. 27, 2020, 13 pgs.

(Continued)

*Primary Examiner* — Tonia L Dollinger
*Assistant Examiner* — Jihad K Boustany
(74) *Attorney, Agent, or Firm* — Sprinkle IP Law Group

(57) ABSTRACT

A method is performed by a computer system. The method includes receiving the source object; providing an upload queue; executing a chunk creation loop to create a first plurality of chunks and add the first plurality of chunks to the upload queue, each chunk in the first plurality of chunks containing a respective portion of the source object; implementing an upload thread pool of upload threads; and executing the upload threads to upload the source object to a distributed data store, including executing the upload threads to upload chunks from the first plurality of chunks to the distributed data store in parallel.

22 Claims, 9 Drawing Sheets

(56) References Cited

U.S. PATENT DOCUMENTS

| | | |
|---|---|---|
| 2014/0304357 A1 | 10/2014 | Bestler |
| 2014/0317060 A1* | 10/2014 | Shen .................... G06F 11/1464 |
| | | 707/652 |
| 2015/0163301 A1* | 6/2015 | Narayanan .............. H04L 67/06 |
| | | 709/205 |
| 2015/0212900 A1 | 7/2015 | Hayasaka |
| 2016/0246538 A1* | 8/2016 | Vazhenin ................ G06F 16/11 |
| 2017/0012906 A1* | 1/2017 | Szilagyi ............... H04B 1/0483 |
| 2020/0186588 A1* | 6/2020 | Xu ....................... G06F 16/1752 |
| 2020/0371861 A1* | 11/2020 | Chen ................... G06F 11/1004 |

OTHER PUBLICATIONS

Notice of Allowance for U.S. Appl. No. 16/842,090, dated Feb. 22, 2021, 3 pgs.

* cited by examiner

METHOD AND SYSTEM FOR EFFICIENT CONTENT TRANSFER TO DISTRIBUTED STORES

TECHNICAL FIELD

This disclosure relates generally to data storage. More particularly, this disclosure relates to methods and systems for efficient content transfer to data stores.

BACKGROUND

Enterprise storage architectures have undergone a shift from a centralized model to the use of distributed data stores. A distributed data store comprises a computer network where information is stored on multiple nodes (e.g., clusters). In some implementations, distributed files may be created and replicated in different clusters of the distributed data store.

Some distributed data stores allow uploading of large files to be done by splitting the file into chunks and uploading each chunk individually. Typically, if the file is less than some threshold, say 2 GB, the file content is transferred to the distributed store in a non-chunking approach, in which the content is streamed byte by byte from the file that needs to be uploaded. If the file meets the threshold for chunking, the content is transferred in a chunking approach. In the non-chunking approach, the file content is split into chunks and the chunks uploaded sequentially chunk-by-chunk until all the file is uploaded; that is, once a chunk of the file is transferred to the distributed data store, the next chunk of the file will be transferred until all the content of the file is uploaded. In some implementations, the chunk size can be configured (e.g., in a "distributed-store-config.properties" file). Files are typically downloaded from a distributed data store byte-for-byte, using a non-chunking approach.

Sequential uploading of chunks can result in substantial delays in upload times. Consequently, a more efficient mechanism for transferring objects to data stores, particularly distributed data stores, is desired.

SUMMARY

Attention is thus directed to the efficient content transfer systems and methods disclosed herein.

According to one embodiment, a method may be performed by a computer system to upload an object to a distributed data store. The method may include receiving a request from a client to upload a source object; receiving the source object; providing an upload queue; executing a chunk creation loop to create a first plurality of chunks and add the first plurality of chunks to the upload queue, the chunk creation loop configured to pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object; implementing an upload thread pool of upload threads, the upload thread pool configured to add a new upload thread to the upload thread pool based on a determination that an upload thread creation condition has been met; and executing the upload threads to upload the source object to a distributed data store, including executing the upload threads to upload chunks from the first plurality of chunks to the distributed data store in parallel.

According to another embodiment, a method may be performed by a computer system, to download an object from a distributed data store. The method may include determining a plurality of chunks to download, each chunk in the plurality of chunks to download comprising a respective portion of the requested object; providing a download queue; executing a chunk-task loop to create a plurality of chunk-tasks and add the plurality of chunk-tasks to the download queue, the chunk-task loop configured to pause creating the plurality of chunk-tasks based on a determination that the download queue is full and resume creating the plurality of chunk-tasks based on a determination that the download queue is not full, each chunk-task in the plurality of chunk-tasks specifying a respective chunk from the plurality of chunks to download; providing a download thread pool comprising download threads, the download thread pool configured to add a new download thread to the download thread pool based on a determination that a download thread creation condition has been met; and executing the download threads to process the plurality of chunk-tasks from the download queue to download the requested object from the distributed data store, including executing the download threads to download chunks of the plurality of chunks to be downloaded in parallel from the distributed data store.

According to another embodiment, a non-transitory computer-readable medium may be provided. The non-transitory computer-readable medium may include computer-readable instructions executable to: receive a request from a client to upload a source object; receive the source object; provide an upload queue; implement a chunk creation loop to create a first plurality of chunks and add the first plurality of chunks to the upload queue, the chunk creation loop configured to pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object; and provide an upload thread pool of upload threads executable to upload the first plurality of chunks to a distributed data store to upload the source object to the distributed data store, the upload threads executable to upload chunks from the first plurality of chunks in parallel, the upload thread pool configured to add a new upload thread to the upload thread pool based on a determination that an upload thread creation condition has been met.

According to another embodiment, a non-transitory computer-readable medium may include computer-readable instructions executable to: receive an object download request to download a requested object from the distributed data store; determine a second plurality of chunks, each chunk in the second plurality of chunks comprising a respective portion of the requested object; provide a download queue; implement a chunk-task loop to create a plurality of chunk-tasks and add the plurality of chunk-tasks to the download queue, the chunk-task loop configured to pause creating the plurality of chunk-tasks based on a determination that the download queue is full and resume creating the plurality of chunk-tasks based on a determination that the download queue is not full, each chunk-task in the plurality of chunk-tasks specifying a respective chunk from the second plurality of chunks to download; and provide a download thread pool comprising download threads to execute the plurality of chunk-tasks from the download queue to download the second plurality of chunks from the distributed data store, the download threads executable to download chunks in the second plurality of chunks in parallel, the download thread pool configured to add a new download thread to the download thread pool based on a determination that a download thread creation condition has been met.

According to another embodiment, a content transfer system is provided. The content transfer system may include a non-transitory computer-readable medium to store instructions. The content transfer system may include a processor to execute the instructions to: receive a request from a client to upload a source object; receive the source object; provide an upload queue; implement a chunk creation loop to create a first plurality of chunks and add the first plurality of chunks to the upload queue, the chunk creation loop configured to pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object; and provide an upload thread pool of upload threads executable to upload the first plurality of chunks to a distributed data store to upload the source object to the distributed data store, the upload threads executable to upload chunks from the first plurality of chunks in parallel, the upload thread pool configured to add a new upload thread to the upload thread pool based on a determination that an upload thread creation condition has been met.

According to another embodiment, a content transfer system that supports parallel downloading is provided. The content transfer system may include a non-transitory computer-readable medium to store instructions. The content transfer system may include a processor to execute the instructions to: receive an object download request to download a requested object from the distributed data store; determine a second plurality of chunks, each chunk in the second plurality of chunks comprising a respective portion of the requested object; provide a download queue; implement a chunk-task loop to create a plurality of chunk-tasks and add the plurality of chunk-tasks to the download queue, the chunk-task loop configured to pause creating the plurality of chunk-tasks based on a determination that the download queue is full and resume creating the plurality of chunk-tasks based on a determination that the download queue is not full, each chunk-task in the plurality of chunk-tasks specifying a respective chunk from the second plurality of chunks to download; and provide a download thread pool comprising download threads to execute the plurality of chunk-tasks from the download queue to download the second plurality of chunks from the distributed data store, the download threads executable to download chunks in the second plurality of chunks in parallel, the download thread pool configured to add a new download thread to the download thread pool based on a determination that a download thread creation condition has been met.

Embodiments described herein can provide advantages over prior chunking approaches. For example, when compared uploading chunks of a file sequentially (no upload thread pool), uploading chunks of the file in parallel using concurrently executing threads of a thread pool can result in substantial gains in upload speed for the file (e.g., 1,000% gain and more in some cases). In general, the gain increases for a given upload thread pool size and chunk size as the size of file to be uploaded increases.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
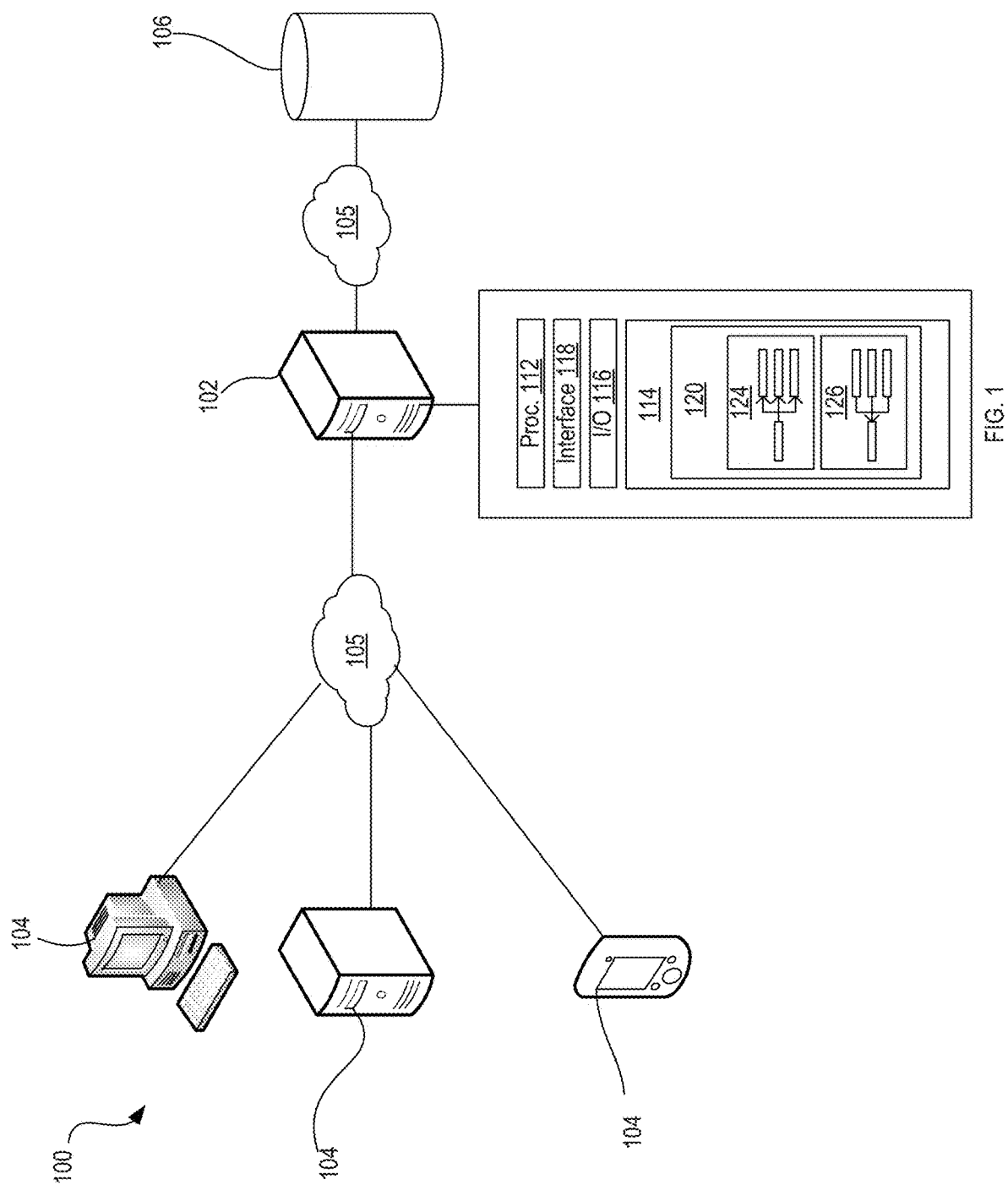
FIG. 1 is a diagrammatic representation of one embodiment of a network system that includes one embodiment of a system for efficient content transfer.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. As mentioned above, it may be desirable to upload large files to or download large files from distributed data stores. However, uploads and downloads of large files to distributed data stores is often relatively slow. What is desired, therefore, are systems that can more quickly upload objects to or download objects from distributed data stores or other data stores.

To those ends, among others, attention is now directed to the systems and methods of efficient content transfer disclosed herein. More particularly, some embodiments provide systems and methods of efficient content transfer using a parallel upload mechanism. In addition, or in the alternative, some embodiments provide systems and methods for efficient content transfer using a parallel download mechanism.

In one embodiment of a parallel upload, a content transfer system receives an object to upload, separates the object into chunks and places the chunks in an upload queue. Each chunk is associated with an object identifier and a chunk identifier, where the object identifier identifies the respective object from which the chunk was made, and the chunk identifier uniquely identifies the chunk within that object. Threads in an upload thread pool execute to operate on the chunks in the upload queue to upload the chunks to the data store in parallel. The chunk identifiers and their object identifier information are propagated to the data store. This information may be used by the data store to merge the chunks back into the object at the data store. The object size and chunk size can also be uploaded to the data store as metadata of the object. This approach of storing the metadata during upload helps improve performance while downloading the content of the object.

In one embodiment of a parallel download, a content transfer system receives a request from an application to download an object. The content transfer system creates chunk-tasks for the chunks to be downloaded and adds the chunk-tasks to a download queue for execution by the threads of a download thread pool. The threads of the download thread pool execute to process chunk-tasks from the download queue to download chunks of the object in parallel. The content transfer system may merge the chunks into a local copy of the object and provide the object to the requesting application or provide the chunks to the requesting application for reassembly at the application.

These and other aspects of efficient content transfer may be better understood with reference to non-limiting embodiments described in conjunction with the figures.

FIG. 1 is a diagrammatic representation of one embodiment of a network system 100 that includes a content transfer system 102 bi-directionally coupled to a plurality of client computers 104 and a data store 106 via a network 105, which may be a local area network (LAN), a wide area network (WAN) such as the Internet, mobile network, or other type of network or combination thereof. Network 105 may represent a combination of wired and wireless networks that network computing environment may utilize for various types of network communications. Content transfer system 102 facilitates uploading and/or downloading of objects from client applications running on client computers 104 to/from data store 106.

Data store 106 is a network accessible data store that provides an interface, such as a public Application Program Interface (API) or other interface, for uploading objects to and/or downloading objects from data store 106. By way of example, but not limitation, data store 106 may be a distributed data store comprising a computer network where information is stored on multiple nodes or clusters. In some embodiments, data store 106 may be a cloud storage system in which digital data is stored in logical pool on physical media that can span multiple servers. The interface provided by data store 106 may support multi-part upload in which an object can uploaded as a set of independently uploaded chunks and/or multi-part download in which an object can be downloaded as a set of independently downloaded chunks.

Content transfer system 102 may comprise one or more computer systems with central processing units executing instructions embodied on one or more computer-readable media where the instructions are configured to perform at least some of the functionality associated with embodiments of the present invention. In illustrated embodiment, content transfer system 102 includes a computer processor 112 and associated memory 114. Computer processor 112 may be an integrated circuit for processing instructions. For example, computer processor 112 may comprise one or more cores or micro-cores of a processor. Memory 114 may include volatile memory, non-volatile memory, semi-volatile memory or a combination thereof. Memory 114, for example, may include RAM, ROM, flash memory, a hard disk drive, a solid-state drive, an optical storage medium (e.g., CD-ROM), or other computer-readable memory or combination thereof. Memory 114 may implement a storage hierarchy that includes cache memory, primary memory or secondary memory. In some embodiments, memory 114 may include storage space on a data storage array. Content transfer system 102 may also include input/output ("I/O") devices 116, such as a keyboard, monitor, printer, electronic pointing device (e.g., mouse, trackball, stylus, etc.), or the like. Content transfer system 102 may also include a communication interface 118, such as a network interface card, to interface with network 105.

Figure 6:
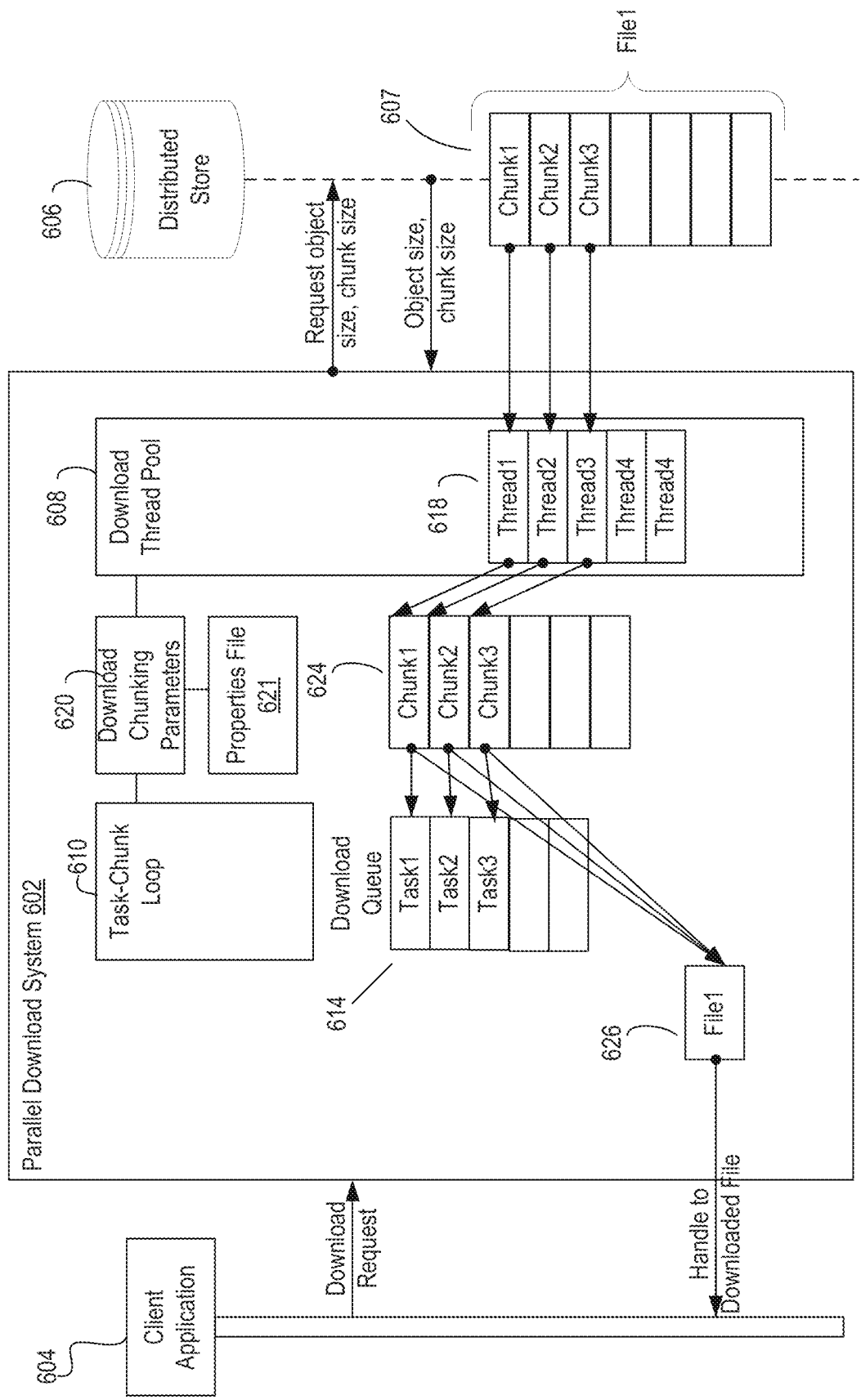
FIG. 6 is a block diagram of one embodiment of a parallel download mechanism servicing a request to download a requested object.

Memory 114 may store instructions executable by computer processor 112. For example, memory 114 may include a content transfer application 120 executable to provide an interface, such as an API or other interface to allow client applications to upload objects to data store 106 and download objects from data store 106 via content transfer system 102. Content transfer application 120 can include a parallel upload mechanism 124 and/or a parallel download mechanism 126 configured to download object chunks from data store 106 in parallel. One embodiment of a parallel upload mechanism is illustrated in FIG. 2 and one embodiment of a parallel download mechanism is illustrated in FIG. 6.

Figure 2:
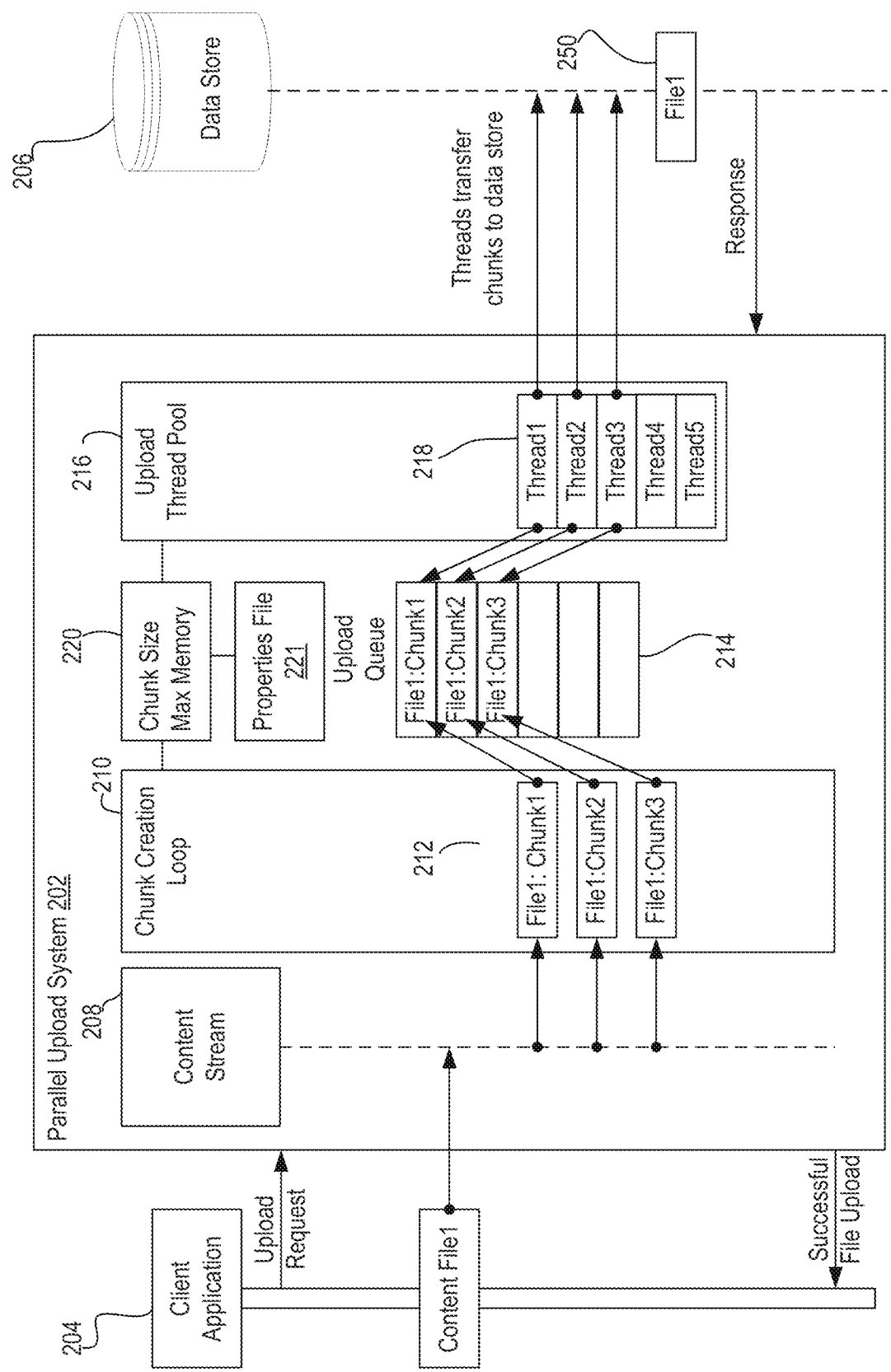
FIG. 2 is a diagrammatic representation of one embodiment of a parallel upload mechanism servicing a request to upload of a source object.

FIG. 2 is a block diagram of one embodiment of a parallel upload mechanism 202, which may be one embodiment of parallel upload mechanism 124, servicing a request to upload an object—a file in the illustrated example—from a client application 204 to a data store 206. According to one embodiment, parallel upload mechanism 202 may be embodied in computer executable instructions stored on a non-transitory computer-readable medium.

Parallel upload mechanism 202 can provide an API or other interface via which parallel upload mechanism 202 can receive an object upload request from a client application 204 requesting to upload an object. An object to be uploaded is referred to as a source object herein. In the illustrated embodiment, parallel upload mechanism 202 receives a request to upload a file (e.g., "File1"). The object upload request may include metadata for the source object such as, but not limited to, a file name, file size and other metadata which parallel upload mechanism 202 can store for use during the upload processing.

Parallel upload mechanism 202 associates the object to be uploaded with an object identifier, such as a number or other identifier. For example, parallel upload mechanism 202 can assign the file to be uploaded—that is, File1 in the example of FIG. 2—a file number. The object identifier can be used to identify multiple chunks of the object as belonging to that source object. For example, the parallel upload mechanism 202 can associated each chunk 212 created from File1 with the file number of File1 to indicate that the chunks belong to File1.

Parallel upload mechanism 202 receives the content of the source object (e.g., the content of File1) from client application 204 as a content stream 208. According to one embodiment, the content of each source object to be uploaded (e.g., file) is received as content stream for that file; or, put another way, each content stream 208 is dedicated to a single source object. Chunk creation loop 210 executes to create 1 ... n chunks 212 of source object content from content stream 208, potentially pausing and resuming chunk creation as discussed below. Each chunk 212, from the first chunk to the last chunk, includes a respective portion of the content of the source object. Chunk creation loop 210 places the chunks 212 in an upload queue 214 for processing by upload threads 218 of upload thread pool 216. According to one embodiment, upload queue 214 is implemented as an in-memory (e.g., in volatile memory) blocking linked list data structure, though other types of queues may be used.

Chunk creation loop 210 creates chunks 212 based on upload chunking parameters 220. Examples of such parameters include, but are not limited to, a maximum memory size for upload chunking ("max_memory_size_for_upload_ chunking") and an upload chunk size ("upload_chunk_ size").

Upload_chunk_size specifies the maximum memory size of individual chunks of the object to be uploaded, though in some embodiments the last chunk may be larger. The value for upload_chunk_size may be a value determined based on a user configuration, a default value, a system specified value or other value. According to one embodiment, a user may set a value for upload_chunk_size in a properties file 221 or another user configuration source. If no user-configured value is set, a default value may be used. By way of example, but not limitation, a default upload chunk size of 5 MB may be used. In some cases, data store 206 may require a minimum upload chunk size. In such circumstances, the default upload_chunk_size may be at least the minimum upload chunk size supported by the data store. Similarly, parallel upload mechanism 202 may limit a user to configuring the upload_chunk_size to be at least the minimum chunk size supported by data store 206.

The max_memory_size_for_upload_chunking specifies a maximum memory to utilize for creating chunks during upload operations. The value for max_memory_size_for_upload_chunking may be a value determined based on a user configuration, a default value, a system specified value or other value. According to one embodiment, a user may set a value for max_memory_size_for_upload_chunking in a properties file 221 or another user configuration source. If no user-configured value is set, a default value is used for max_memory_size_for_upload_chunking. By way of example, but not limitation, a default maximum memory size for upload chunking of 50 MB may be used.

As discussed further below, the upload chunk size and the maximum memory size for upload chunking can be used to determine a maximum number of chunks allowable in upload queue 214 and threads in thread pool 216. In some cases, user configurations for upload chunk size and maximum memory size for upload chunking could result in a situation in which efficient uploading is prevented. For example, if the user defined configuration for upload_c- hunk_ size and/or max_memory_size_for_upload_chunking results in max_memory_size_for_upload_chunking divided by upload_chunk_size<1, this means insufficient memory is allocated to achieve parallel uploading for the upload_c- hunk_size. Various rules may be implemented to limit these circumstances.

The user may be limited to setting a user-configured value for the maximum memory size for upload chunking to a value that is larger than the default upload chunk size. For example, the minimum max_memory_size_for_upload_c- hunking can be set to 10 MB for the default upload chunk size of 5 MB. Moreover, if the user defined configuration for upload_chunk_size and/or max_memory_size_for_upload_ chunking results in max_memory_size_for_upload_chunking divided by upload_chunk_size<1, parallel upload mechanism 202 may override a user configured value for upload chunk size and use the default value.

In some embodiments, a user may modify the configuration by changing the user-provided values in property file 221 or other configuration source. According to one embodiment, parallel upload mechanism 202 dynamically updates upload chunking parameters 220 for the next object upload request if the user-provided configuration changes.

Chunk creation loop 210 creates n chunks 212 of the source object's content (e.g., chunks of File1 content) from content stream 208 starting at the first byte (offset 0) of the source object's content to the last byte. According to one embodiment, chunk creation loop 210 creates chunks 212 as in-memory byte stream objects. In general, each chunk 212 created from the content stream 208 has a size as specified by the upload_chunk_size parameter, though, in some cases, the last chunk for an object may be have a different size. For example, parallel upload mechanism 202 can be configured to ensure that the last chunk is at least the default chunk size, the upload_chunk_size, the minimum chunk size supported by data store 206 or other chunk size. In a particular embodiment, if the amount of pending source object content—that is, the amount of content of the source object that has not been placed in a 1 ... (n−1) chunk 212—is less than 2*upload_chunk_size, then the last chunk (the $n^{th}$ chunk) can be created using the remaining content of the source object such that the last chunk may be larger than the other chunks. Using a 5 MB upload_chunk_size, a 102 MB file can be separated into nineteen 5 MB chunks and one 7 MB chunk. In another embodiment, the last chunk is created from the pending content when the pending content is less than or equal to the upload_chunk_size resulting in a last chunk that may be smaller than the other chunks created for the source object. For example, a 102 MB file can be separated into twenty 5 MB chunks and one 2 MB chunk.

Chunk creation loop 210 pauses creation of new chunks 212 when defined pause conditions are met. According to one embodiment, chunk creation loop 210 pauses creating chunks of a source object when the upload queue 214 reaches a maximum upload queue size (max_upload_ queue_ size). Chunk creation loop 210 resumes creating new chunks of the source object when the pause conditions are no longer satisfied. For example, chunk creation loop 210 may resume creating chunks 212 when upload queue 214 drops below its max_upload_queue_size. This may occur for example if a new upload thread 218 is created and takes a chunk 212 from upload queue 214 or any of the existing upload threads 218 in thread pool 216 finishes processing a chunk 212 and takes another chunk 212 from upload queue 214. Chunk creation loop 210 continues to create chunks 212 from content stream 208, pausing and resuming as needed, until all the chunks for the source object have been created and enqueued.

The max_upload_queue_size may be determined in a number of ways in various embodiments. In one embodiment, the value of max_upload_queue_size may be set as a default value or by configuration (e.g., from properties file 221). In another embodiment, max_upload_queue_size may be determined at runtime based on the upload_chunk_size and max_memory_size_for_upload_chunking. By way of example, but not limitation, the parallel upload mechanism 202 determines the max_upload_queue_size for upload queue 214 based on:

$$\text{max\_upload\_queue\_size} = \frac{\frac{1}{2}*(\text{max\_memory\_size\_for\_upload\_chunking})}{\text{upload\_chunk\_size}}$$

If the max_upload_queue_size results in a decimal, the previous integer value may be taken as the max_upload_queue_size. For example, if the calculated max_upload_queue_size is 10.5, then the max_upload_queue_size can be set to 10 chunks.

Chunk creation loop 210 enqueues each chunk 212 created from the content stream 208 of a source object's content with respective chunk metadata, which may include the object id for that source object and a chunk id, such as chunk number. Thus, each chunk 212 created from the content stream of File1 can be associated with the file number of File1 and a chunk number. The chunk number (or other chunk id) uniquely identifies a respective chunk of a source object from other chunks of the same source object. In some embodiments, the chunk id identifies the position of the respective chunk in the source object. For example, each chunk created from a stream of File1 content may be assigned a sequential number that indicates that chunk's relative position in File1. Chunk metadata may also include other information such as the chunk length. For the last chunk of a source object, chunk creation loop 210 adds a last chunk status (e.g., in the metadata of the last chunk).

Upload thread pool 216 maintains upload threads 218 that take chunks 212 from upload queue 214 and independently upload the chunks 212 and respective chunk metadata to data store 206. According to on embodiment, upload threads 218 take chunks 212 from queue 214 in FIFO order. In some embodiments, threads 218 of thread pool 216 execute concurrently on a processor to upload chunks 212 of the source object in parallel. In other embodiments, threads 218 execute in parallel on multiple processors or processor cores to upload chunks 212 in parallel.

Thread pool 216 automatically creates a new upload thread 218 when defined upload thread creation conditions are met. According to one embodiment, the upload thread creation conditions include i) a chunk 212 is available for processing in upload queue 214, ii) there are no free upload threads 218 in thread pool 216 to process the available chunk from upload queue 214, and iii) the total number of threads 218 in thread pool 216 does not exceed a maximum number of threads allowable in the upload thread pool (max_upload_threads). Parallel upload mechanism 202 can thus add threads to thread pool 216 as needed up to max_upload_threads.

The maximum number of upload threads allowable in the upload thread pool 216 may be determined in a number of ways in various embodiments. In one embodiment, the value of max_upload_threads may be set as a default value or by configuration (e.g., from properties file 221). In another embodiment, max_upload_threads may be determined at runtime based on the upload_chunk_size and max_memory_size_for_upload_chunking. By way of example, but not limitation, the max_upload_threads for thread pool 216 can be determined as:

$$\text{max\_upload\_threads} = \frac{\frac{1}{2}*(\text{max\_memory\_size\_for\_upload\_chunking})}{\text{upload\_chunk\_size}}$$

If the value of max_upload_threads results in a decimal, the following integer value may be taken as the max_upload_threads in one embodiment. For example, if the calculated max_upload_threads is 10.5, then the max_upload_threads can be set to 11 threads.

Thread pool 216 may also kill an upload thread 218 when defined upload thread removal conditions are met, such as a thread being idle for longer than a specified period of time (e.g., 1 s or other specified time). Thread pool 216 can automatically create a new thread 218 if needed when a chunk becomes available in upload queue 214.

When an upload thread 218 processes the last chunk of a source object, the thread 218 can send the last chunk status along with the last chunk to the data store to indicate that all the chunks of the source object (e.g., all the chunks of File1) have been delivered. As will be appreciated, the data store 206 can merge the chunks of a source object using the object identifier and chunk ids associated with the chunks 212 to create an uploaded object (e.g., uploaded File1 250), which may be a distributed object. When the chunks have been merged, data store 206 sends a response that the source object has been successfully uploaded (e.g., response that all the chunks of the object have been merged). Based on the response from data store 206, parallel upload mechanism 202 can send a successful object upload response to client application 204.

According to one embodiment, parallel upload mechanism 202 interacts with data store 206 to update the data store's metadata for the respective uploaded object with the size of the respective uploaded object and the number of chunks and/or upload chunk size. For example, if File1 is 2 GB and uploaded as forty, 5 MB chunks, parallel upload mechanism 202 may update data store 206's metadata for File1 to include the file size of 2 GB, the upload_chunk_size of 5 MB and/or the number of chunks as 40. This approach of storing the metadata during upload can improve performance while downloading the content of the object.

Figure 3:
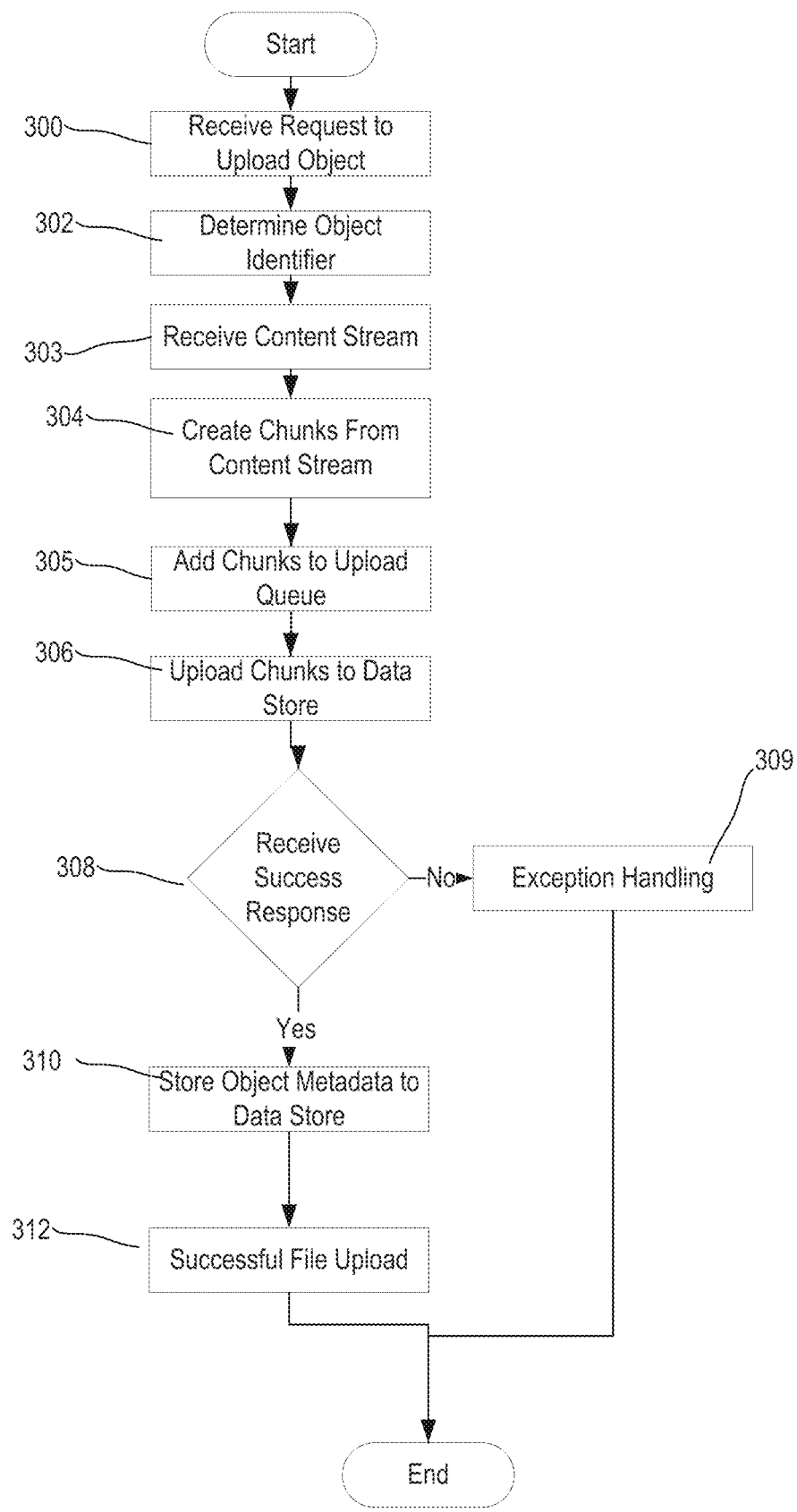
FIG. 3 is a flow chart illustrating one embodiment of a method for parallel upload.

FIG. 3 is a flow chart illustrating one embodiment of a method for parallel upload. One or more steps of FIG. 3 may be embodied as computer-executable instructions on a non-transitory computer-readable medium. One or more steps of FIG. 3 may be implemented by a content transfer system, such as but not limited to content transfer system 102 comprising a parallel upload mechanism 202.

According to one embodiment, a content transfer system receives a request to upload a source object, such as a file or other object (step 300). The content transfer system determines an object identifier, such as an object number or other object identifier, for the source object (step 302). In some embodiments, the object identifier is received in the request. In other embodiments, content transfer system generates the object identifier for purposes of uploading the object. The content transfer system receives the content of the source object as a content stream (step 303). The content transfer system creates chunks of the source object's content from the content stream (step 304). According to one embodiment, each chunk is created as an in-memory byte stream object. Each chunk of the source object's content is associated with the object identifier and a chunk identifier. The object identifier can be used to identify multiple chunks as belonging to a particular source object. The chunk identifier assigned to a chunk identifies a unique content chunk of the source object (e.g., a unique chunk of a file).

The content transfer system adds each chunk to an upload queue (e.g., upload queue 214) (step 306). The upload queue may be an in-memory upload queue for chunks of an object to be uploaded. According to one embodiment, upload queue may be implemented as a blocking linked list data structure.

At step 308, the content transfer system uploads chunks from the upload queue to a data store. In particular, multiple upload threads may execute concurrently or in parallel to upload multiple chunks in parallel. When an upload thread processes the last chunk of the object, the thread sends the last chunk status along with the last chunk to the data store to indicate that all the chunks of the source object have been delivered.

The content transfer system determines if the object was successfully uploaded (step 308). For example, the content transfer system can determine if it has received a response from the data store that the chunks of the object have been successfully merged. If the content transfer system determines that the object was not successfully uploaded, exception handling may be implemented (step 309). If the content transfer system determines that the object has been successfully uploaded, the content transfer system updates the data store's object metadata for the uploaded object with, for example, the upload chunk size, object size, and/or other metadata for the object (step 310) and sends a response to the client application indicating a successful upload of the source object (step 312).

FIG. 3 is provided by way of example. The steps of FIG. 3 may be performed in different orders, steps omitted, additional steps added and/or steps repeated.

Figure 4:
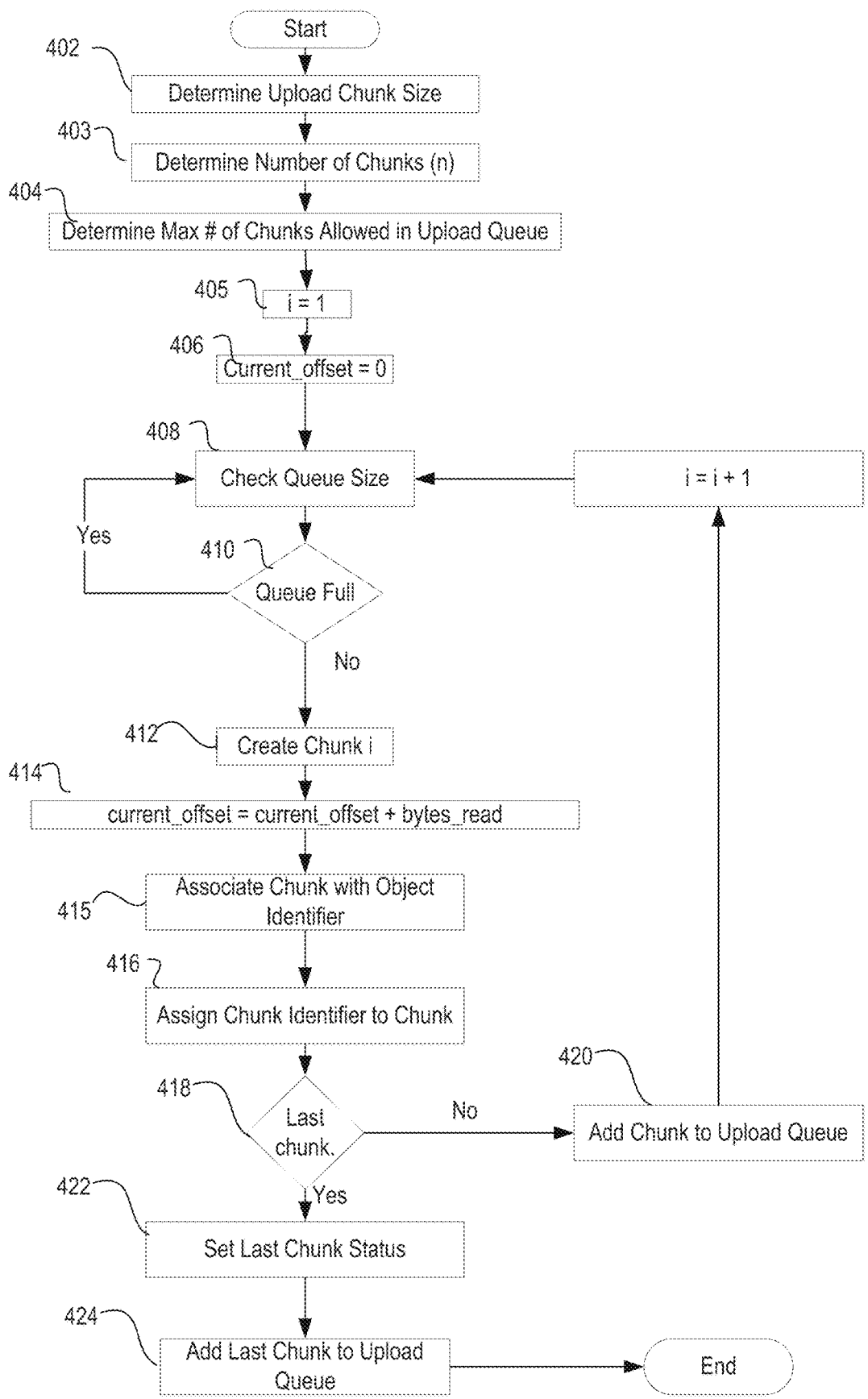
FIG. 4 is a flow chart illustrating one embodiment of a method for creating chunks of an object and adding chunks of an object to a queue.

FIG. 4 is a flow chart illustrating one embodiment of a method for creating chunks of an object and adding chunks of an object to a queue. FIG. 4 may represent one embodiment of steps 304 and 305. One or more steps of FIG. 4 may be embodied as computer-executable instructions on a non-transitory computer-readable medium. One or more steps of FIG. 4 may be implemented through execution of computer-readable instructions such as content transfer application 120. Even more particularly, one or more steps of FIG. 4 may be implemented by execution of a parallel upload mechanism, such as parallel upload mechanism 202. At least a portion of the method of FIG. 4 may be performed by, for example, a chunk creation loop, such as chunk creation loop 210.

As discussed above, the creation of chunks may depend on a number of upload chunking parameters. According to one embodiment, the content transfer system determines an upload chunk size (step 402). The upload_chunk_size may be specified in a user defined configuration, set based on a default upload chunk size or otherwise determined. The upload_chunk_size and the object size, for example a file size, can be used by the content transfer system to determine the total number of chunks for the source object (step 403).

The content transfer system can further determine a max_upload_queue_size (step 404). As discussed above, the max_upload_queue_size may be set in a configuration or by default in some embodiments. In other embodiments, the max_upload_queue_size is a function of the upload_chunk_size and a max_memory_size_for_upload_chunking. Thus, determining the max_upload_queue_size may include determining the max_memory_size_for_upload_chunking. As discussed previously, max_memory_size_for_upload_chunking may be specified in a user defined configuration, set based on a default upload chunk size or otherwise determined.

As indicated at steps 405 and 406, a chunk creation loop can be implemented to create chunks starting a first byte (offset 0) of a source object's content in a content stream. At step 408, the content transfer system checks the size of the upload queue and, at step 410, determines if the upload queue is full. For example, the content transfer system determines if the number of chunks in the upload queue is greater than max_upload_queue_size. Based on a determination that the upload queue is full the content transfer system pauses creating new chunks until there is room in the upload queue for a new chunk. Based on a determination that the upload queue is not full the content transfer system can create a new chunk i (step 412) from pending content. According to one embodiment, the chunk creation loop reads bytes from the content stream beginning at a current position (current offset) in the source object's content. In general, the chunk creation loop reads an upload_chunk_size amount of pending source object content from the content stream into a new chunk. In the case of the last chunk, the chunk creation loop may read more or less than upload_chunk_size amount of content into the last chunk. At step 414, the current position in the source object's content is updated. In the embodiment illustrated, the current position is updated according to the number of bytes read into chunk i, which in one embodiment will be the upload_chunk_size for most chunks but may be more or fewer bytes for the last chunk.

When the chunk is created, the content transfer system associates the chunk with the object identifier for the source object from which the chunk was created and assigns the chunk a chunk id that uniquely identifies that chunk from other chunks of the source object (step 415 and step 416).

At step 418, the chunk creation loop determines if the chunk is the last chunk (e.g., based on the number of chunks created, current_offset or other information). If the new chunk is not the last chunk of the source object's content, the chunk creation loop places the chunk in the upload queue (step 420) with chunk metadata (e.g., chunk size, object identifier, chunk identifier) and continues processing to create the next chunk of the source object's content. If chunk i is the last chunk of the source object's content, the content transfer system sets the status of the chunk to indicate that it is the last chunk (step 422) and adds the last chunk to the upload queue (step 424) with chunk metadata (e.g., chunk size, object identifier, chunk identifier, last chunk status).

FIG. 4 is provided by way of example. The steps of FIG. 4 may be performed in different orders, steps omitted, additional steps added and/or steps repeated.

Figure 5:
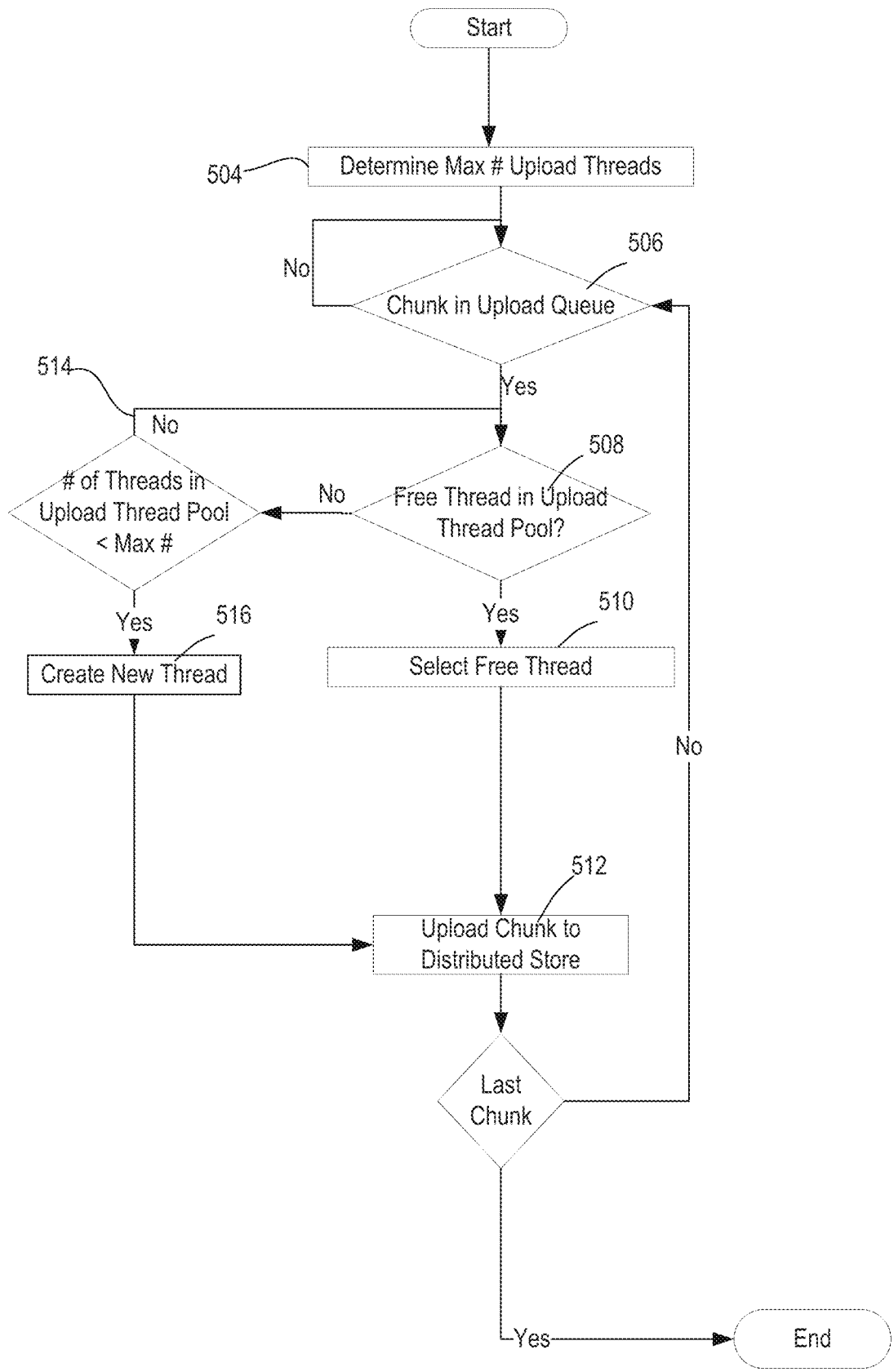
FIG. 5 is a flow chart illustrating one embodiment of a method for uploading chunks of a source object to a data store.

FIG. 5 is a flow chart illustrating one embodiment of a method for uploading chunks of a source object to a data store. FIG. 5 may represent one embodiment of step 306. One or more steps of FIG. 5 may be embodied as computer-executable instructions on a non-transitory computer-readable medium. One or more steps of FIG. 5 may be implemented by a content transfer system, such as but not limited to content transfer system 102 comprising a parallel upload mechanism 202. Even more particularly, one or more steps of FIG. 5 may be implemented by a thread pool, such as thread pool 216.

The content transfer system determines a max_upload_threads (step 504). As discussed above, the max_upload_threads may be set in a configuration or by default in some embodiments. In other embodiments, the max_upload_threads value is a function of the upload_chunk_size and a max_memory_size_for_upload_chunking. Thus, determining the max_upload_threads may include determining the upload_chunk_size and max_memory_size_for_upload_chunking. As discussed previously, the upload_chunk_size and max_memory_size_for_upload_chunking may be specified in a user-defined configuration, set based on defaults or otherwise determined.

The content transfer system determines if there are any chunks available for processing in an upload queue (step 506). If not, the content transfer system can wait until a chunk is available in the upload queue.

If a chunk is available in the upload queue, the content transfer system determines if there is an available upload thread in the upload thread pool to process the chunk (step 508). If there is an available thread in the upload thread pool, the content transfer system selects the available thread in the upload thread pool to process the chunk (step 510) and executes the selected thread to upload the chunk to the data store (step 512). Uploading the chunk may include uploading the content chunk with chunk metadata, such as, but not limited to, the source object identifier, chunk identifier, chunk length, indicator of last chunk status and/or other chunk metadata.

Returning to step 508, if there is not a free upload thread in the upload thread pool to process an available chunk in the upload queue, the content transfer system can determine if a new thread should be created in the upload thread pool. According to one embodiment, the content transfer system determines if the number of threads in the upload thread pool has reached max_upload_threads (step 514). If the number of threads in the upload thread pool is not less than max_upload_threads, the content transfer system can wait until an upload thread becomes available in the upload thread pool to handle the available chunk. If the number of threads in the upload thread pool is less than max_upload_threads, the content transfer system can add a thread to the thread pool (step 516) and execute the new thread to upload the chunk to the data store (step 512).

At step 514, the upload thread uploading the chunk determines if the chunk uploaded is the last chunk of the source object and, if not, control returns to step 506. If the chunk is the last chunk of the source object, the upload of chunks is complete and control can pass to step 308 of FIG. 3.

FIG. 5 is provided by way of example. The steps of FIG. 5 may be performed in different orders, steps omitted, additional steps added and/or steps repeated.

FIG. 6 is a block diagram of one embodiment of a parallel download mechanism 602, which may be one embodiment of a parallel download mechanism 126, servicing a download request from a client application 604 to download an object 607—a file in the illustrated example—from data store 606. Requested object 607, which may be a distributed object, may have been uploaded to data store 606 by a parallel upload mechanism (e.g., parallel upload mechanism 202) or other mechanism.

Parallel download mechanism 602 provides an interface, such as an API or other interface, via which client application 604 interacts with parallel download mechanism 602 to request objects and receive the objects. As such, parallel download mechanism 602 can receive an object download request from client application 604 requesting to download an object 607. In the illustrated embodiment, parallel download mechanism 602 receives a request to download a file (e.g., "File1"). Based on the client application 604's request, parallel download mechanism 602 downloads the requested object 607 from data store 606.

Data store 606, which may be one example of data stores 106, 206, stores associated object metadata for object 607, such as, but not limited to an object identifier, object size and chunk size (e.g., the upload_chunk_size). Based on the object download request, the content transfer system executes a thread 618 to request the object metadata for requested object 607 and stores the object metadata for use in parallel downloading of requested object 607.

Parallel download mechanism includes a chunk-task creation loop that creates tasks to download chunks 624 of the object 607 and a download thread pool 608 of download threads 618 that execute the chunk-tasks to download chunks 624. Chunk-task loop 610 creates chunk-tasks based on download chunking parameters 620. Examples of such parameters include, but are not limited to, a maximum memory size for download chunking ("max_memory_size_for_download_chunking") and a download chunk size ("download_chunk_size").

Download_chunk_size specifies the maximum memory size of individual chunks, though in some embodiments the last chunk for an object may be larger. The value for download_chunk_size may be a value determined based on a user configuration, a default value, a system specified value or other value. According to one embodiment, the value for download_chunk_size is set to a chunk size contained in the object metadata of the object 607 to be downloaded, which in some implementations is the same as an upload_chunk_size used to upload object 607. If data store 606 does not provide a chunk size for object 607, a default value can be used. By way of example, but not limitation, a default download chunk size of 5 MB can be used. In some cases, data store 606 may require a minimum download chunk size. In such circumstances, the default upload_chunk_size may be at least the minimum download chunk size supported by the data store. Parallel upload mechanism 602 may also limit a user to configuring the download_chunk_size to be least the minimum chunk size supported by data store 206.

Download chunking parameters may also include a maximum memory size for download chunking (max_memory_size_for_download_chunking) that specifies a maximum memory to utilize for downloading chunks. The value for max_memory_size_for_download_chunking can be a value determined based on a user configuration, a default value, a system specified value or other value. According to one embodiment, a user can set a value for max_memory_size_for_download_chunking in a properties file 621, which can be the same as properties file 221 in some embodiments, or another user configuration source. If no user-configured value is set, a default value is used for max_memory_size_for_download_chunking. By way of example, but not limitation, a default maximum memory size for download chunking of 50 MB can be used.

As discussed further below, the download chunk size and the maximum memory size for download chunking can be used to determine a maximum number of chunk-tasks allowable in download queue 614 and threads in thread pool 608. In some cases, the download chunk size and maximum memory size for download chunking could result in a situation in which efficient downloading is prevented. For example, if the chunk size value provided by data store 606 and max_memory_size_for_download_chunking result in max_memory_size_for_download_chunking divided by download_chunk_size<1, this indicates that insufficient memory is allocated to achieve parallel downloading for the download_chunk_size. Various rules may be implemented to limit these circumstances.

The user may be limited to setting a user-configured value for the maximum memory size for download chunking to a value that is larger than the default download chunk size. For example, the minimum max_memory_size_for_download_chunking can be set to 10 MB for the default download chunk size of 5 MB. Moreover, if the chunk size provided by data store 606 and max_memory_size_for_download_chunking result in max_memory_size_for_upload_chunking divided by upload_chunk_size<1, parallel download mechanism 602 can use the default value for download_chunk_size.

Parallel download chunking parameters 620 may also include a parameter indicating whether the parallel download mechanism 602 will merge chunks downloaded from data store 606 or if the chunks will be provided to the client application 604 for merging. For example, a property "enable.client.side.chunks-merging" gives an indication that the downloaded chunks of a file need to be merged at a local disk or these chunks will be merged at client application. This property can be configured in properties file 621 with a default value for the property as false. If the value to this property "enable.client.side.chunks-merging" is set to True in file 621, the downloaded chunks will be sent to client application 604 that requested an object download. Otherwise, the chunks will be merged into a new copy of the object by parallel download mechanism 602 and a stream of the object provided to the client application 604. For example, if the requested object is a file, a new file will be created in the local disk with the downloaded chunks and a stream of this file will be provided to the client application. The downloaded chunks are written to a file in the local disk in the order in which these chunks of the file exist at data store 606.

In some embodiments, a user can modify the configuration by changing the user-provided values in property file 621 or other configuration source. According to one embodiment, parallel download mechanism 602 dynamically updates download chunking parameters 620 for the next object download request if the user-provided configuration changes.

Based on the client application 604's object download request, a download thread 618 is executed to request object metadata from data store 606 including a chunk size and object size (e.g., file size for a file to be downloaded). As discussed above, parallel download mechanism 602 can use the chunk size provided for object 607 by data store 606 as the download_chunk_size.

Parallel download mechanism 602 determines the total number of chunks (n) of object 607 to be downloaded based on the download_chunk_size and object size. As will be appreciated, if the download_chunk_size is the same as the chunk size used to upload object 607, then the number chunks (n) will be the same for download and upload. It can be noted that the manner in which parallel download mechanism handles the last chunk will affect the total number of chunks. For example, according to one embodiment, parallel download mechanism 602 can consider the last portion of the object 607 that is <2*download_chunk_size, to be a single chunk. Using the example of a 5 MB download_chunk_size, a 102 MB object 607 can be considered to have nineteen 5 MB chunks and one 7 MB chunk. In another embodiment, the parallel download mechanism 602 considers the last portion of object 607 that is less than or equal to the download_chunk_size to be the last chunk, resulting in a last chunk that can be smaller than the other chunks of object. Using the example of a 5 MB download_chunk_size, a 102 MB object 607 can be considered to have twenty 5 MB chunks and one 2 MB chunk.

Parallel download mechanism 602 further determines the starting and ending offsets of all the chunks of object 607 to be downloaded using the total number of chunks of object 607, the object size (e.g., file size) of object 607 and the download_chunk_size. According to one embodiment, the starting offset for each chunk i, where i=1 . . . n, is (i−1)*download_chunk_size, the ending offset for each chunk i=1 . . . (n−1) is i*(download_chunk_size−1) and the ending offset for chunk n is the offset for the last byte of the content of object 607.

A chunk-task loop 610 creates a chunk-task for each chunk of the object to be downloaded. According to one embodiment, a chunk-task for a respective chunk includes chunk offset positions (start and end offset positions), a unique chunk identifier and an object identifier (e.g., file number or another object identifier for object 607). The object identifier can be used to identify multiple chunks as belonging to a particular object (e.g., object 607). A chunk identifier identifies a unique content chunk of the object (e.g., a unique chunk of a file). For example, chunk of object 607 to be downloaded can be assigned be assigned a sequential number that indicates that chunk's relative position in object 607. Chunk-task loop 610 places the chunk-tasks in an in-memory download queue 614 of chunk-tasks for the object to be downloaded. According to one embodiment, download queue 614 can be implemented as an in-memory blocking linked list data structure.

Chunk-task loop 610 pauses creation of new chunk-tasks when defined pause conditions are met. According to one embodiment, chunk-task loop 610 pauses creating chunk-tasks for an object to be downloaded when the download queue 614 reaches a maximum download queue size (max_download_queue_size). Chunk-task loop 610 resumes creating new chunk-tasks for the object 607 to be downloaded when the pause conditions are no longer satisfied. For example, chunk-task loop 610 resumes creating chunk-tasks when download queue 614 drops below its max_download_queue_size. This can occur for example if a new download thread 618 is created and takes a chunk-task from download queue 614 or any of the existing download threads 618 in thread pool 608 finishes processing a chunk-task and takes another chunk-task from download queue 614. Chunk-task loop 610 continues to create chunk-tasks, pausing and resuming as needed, until chunk-tasks corresponding to all the chunks of the object to be downloaded have been created and enqueued.

The maximum download queue size can be determined in a number of ways in various embodiments. In one embodiment, the value of max_download_queue_size can be set as a default value or by configuration (e.g., from properties file 621). In another embodiment, max_download_queue_size can be determined at runtime based on the download_chunk_size and max_memory_size_for_download_chunking. By way of example, but not limitation, the max_download_queue_size for download queue 614 can be determined as:

$$\text{max\_download\_queue\_size} = \frac{\frac{1}{2} * (\text{max\_memory\_size\_for\_download\_chunking})}{\text{download\_chunk\_size}}$$

If the max_download_queue_size results in a decimal, the previous integer value may be taken as the max_download_queue_size. For example, if the calculated max_download_queue_size is 10.5, then the max_download_queue_size can be set to 10 chunk-tasks.

Download thread pool 608 maintains download threads 618 that take chunk-tasks from download queue 614 and independently download the chunks 624 from data store 606. According to on embodiment, download threads 618 take chunk-tasks from queue 614 in FIFO order. Download threads 618 of thread pool 608 can execute concurrently on a processor to download chunks 624 in parallel. In other embodiments, threads 618 can execute in parallel on multiple processors or processor cores to download chunks 624 in parallel.

Download thread pool 608 automatically creates a new download thread 618 when defined download thread creation conditions are met. According to one embodiment, the download thread creation conditions include i) a chunk-task is available for processing in download queue 614, ii) there are no free download threads 618 in thread pool 608 to process the available chunk-task from download queue 614, and iii) the total number of threads 618 in thread pool 608 does not exceed a maximum number of threads allowable in the download thread pool (max_download_threads). Parallel download mechanism 602 can thus add threads to thread pool 608 as needed up to max_download_threads.

The maximum number of download threads 618 allowable in the download thread pool may be determined in a number of ways in various embodiments. In one embodiment, the value of max_download_threads can be set as a default value or by configuration (e.g., from properties file 621). In another embodiment, max_download_threads can be determined at runtime based on the download_chunk_size and max_memory_size_for_download_chunking. By way of example, but not limitation, the max_download_threads for thread pool 608 can be determined as:

$$\text{max\_download\_threads} = \frac{\frac{1}{2} * (\text{max\_memory\_size\_for\_download\_chunking})}{\text{download\_chunk\_size}}$$

If the value of max_download_threads results in a decimal, the following integer value can be taken as the max_download_threads in one embodiment. For example, if the calculated max_download_threads is 10.5, then the max_download_threads can be set to 11 threads.

Thread pool 608 may also kill a download thread 618 when defined download thread removal conditions are met. According to one embodiment, thread pool 608 kills a download thread 618 if the thread is idle (e.g., does not find any chunk-tasks in download queue 614) for longer than a defined period of time, such as one second or other specified period. A new thread 618 can be created automatically if needed when a chunk-task becomes available in download queue 614.

As discussed above, download threads 618 execute chunk-tasks from download queue 614 to download chunks 624 of object 607. According to one embodiment, a download thread downloads a chunk 624 by requesting the portion of object 607's content specified in chunk-task, creating a respective byte stream object and reading the returned portion of object 607's content into the respective byte stream object.

If the value to the property "enable.client.side.chunks-merging" is set to True in file 621, the downloaded chunks 624 will be sent to client application 604 that requested the object download. Otherwise, the chunks 624 are merged into a new copy of the object (e.g., as downloaded object 626) by parallel download mechanism 602 and a stream of the downloaded object 626 provided to the client application 604. For example, if the requested object is a file, a new file can be created in the local disk using the downloaded chunks. The downloaded chunks 624 are written to the file in the local disk in the order in which the chunks 624 of the file exist at data store 606 to create the downloaded object 626. A handle to the file is provided to client application 604, which can use the handle to download the file from content transfer system. According to one embodiment, a stream of the file is sent to client application 604.

Figure 7:
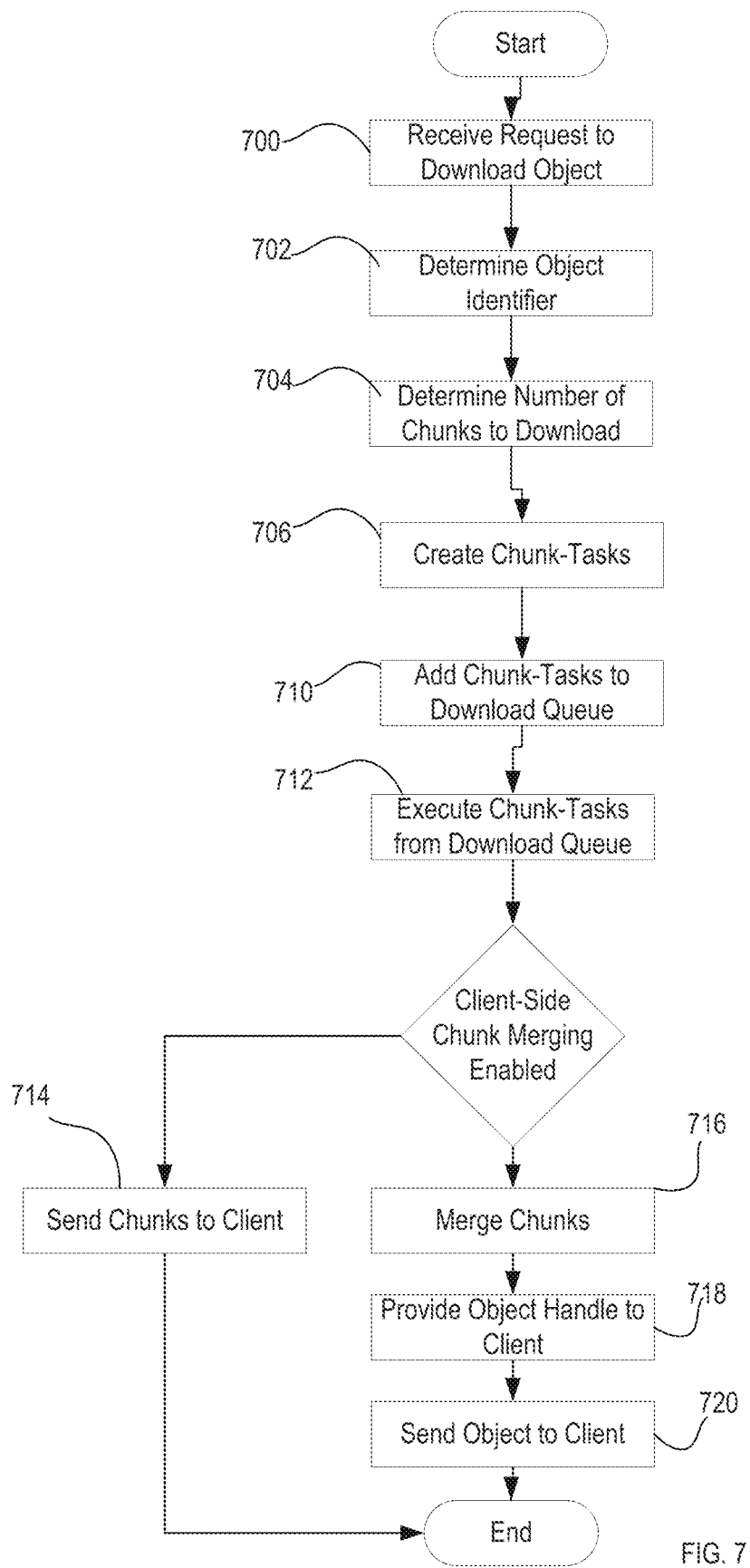
FIG. 7 is a flow chart illustrating one embodiment of a method for parallel file download.

FIG. 7 is a flow chart illustrating one embodiment of a method for parallel file download. One or more steps of FIG. 7 may be embodied as computer-executable instructions on a non-transitory computer-readable medium. One or more steps of FIG. 7 may be implemented by a content transfer system, such as but not limited to content transfer system 102 comprising a parallel download mechanism 602.

According to one embodiment, a content transfer system receives a request to download an object, such as a file or other object (step 700). The content transfer determines an object identifier, such as an object number or other object identifier, for the objected to be downloaded (step 702). In some implementations, the object identifier is received in the request. In other embodiments, the object identifier can be generated by content transfer system for purposes of downloading the object from a data store. At step 704, the content transfer system determines the number of chunks for the object to be downloaded. According to one embodiment, the content transfer determines the number of chunks based on a download chunk size and the size of the object to be downloaded.

At step 706, the content transfer system creates a chunk-task for each chunk determined in step 704. A chunk-task identifies content to be downloaded as a chunk. According to one embodiment, a chunk-task includes the object identifier for the object to be downloaded, a chunk identifier and offsets or other information that is usable to identify a specific portion of the object to be downloaded.

The content transfer system adds each chunk-task to a download queue (e.g., download queue 614) (step 710). The download queue can be an in-memory download queue for chunk-tasks executable to download chunks of the object. According to one embodiment, the download queue is a blocking linked list data structure.

At step 712, the content transfer system executes chunk-tasks from the download queue to download chunks of the object from the data store. In particular, multiple download threads can execute concurrently or in parallel to download multiple chunks in parallel.

If the chunks are to be merged at the client, the chunks are sent to the client for merging (step 714). Otherwise, the content transfer system merges the chunks into a copy of the object (the "downloaded object") (step 716) and provides a handle to the downloaded object to the client (step 718). The content transfer system can the downloaded object to the client as a content stream or otherwise send the downloaded object to the client (step 720).

FIG. 7 is provided by way of example. The steps of FIG. 7 may be performed in different orders, steps omitted, additional steps added and/or steps repeated.

Figure 8:
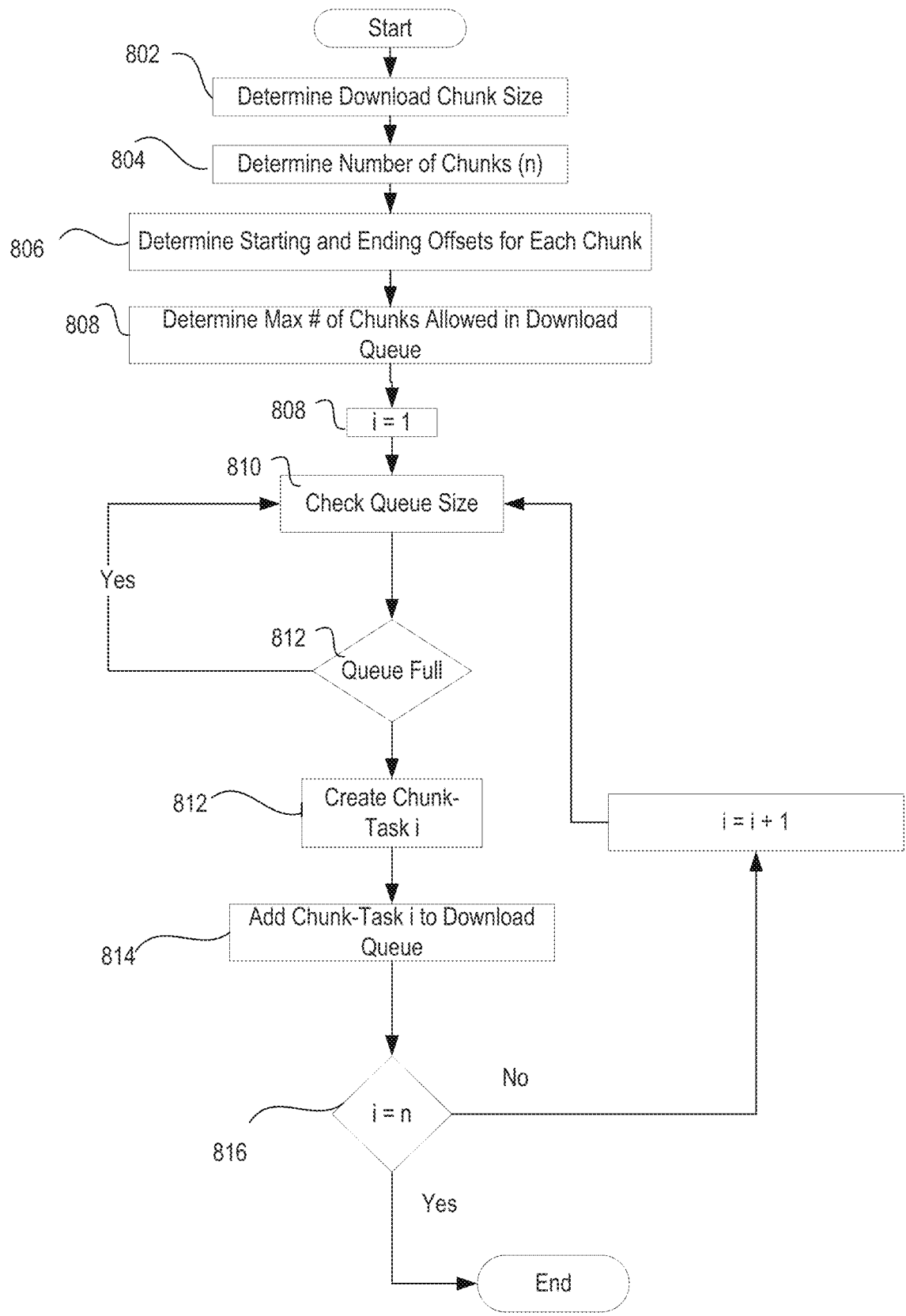
FIG. 8 is a flow chart illustrating one embodiment of a method for creating chunk-tasks and adding chunk-tasks to a download queue.

FIG. 8 is a flow chart illustrating one embodiment of a method for creating chunk-tasks and adding chunk-tasks to a queue. FIG. 8 may represent one embodiment of steps 704, 706, 710. One or more steps of FIG. 8 can be embodied as computer-executable instructions on a non-transitory computer-readable medium. One or more steps of FIG. 8 can be implemented through execution of computer-readable instructions, such as content transfer application 120. Even more particularly, one or more steps of FIG. 8 can be implemented by execution of a parallel download mechanism, such as parallel download mechanism 602. At least a portion of the method of FIG. 8 can be performed by a chunk-task loop, such as chunk-task loop 610.

As discussed above, the creation of chunk-tasks may depend on a number of download chunking parameters. According to one embodiment, the content transfer system determines a download chunk size (step 802). In one embodiment, the content transfer system requests object metadata for the object to be downloaded where the object metadata includes a chunk size and an object size, for example file size. The content transfer system may determine the download_chunk_size based on the chunk size provided in the object metadata, a default upload chunk size or otherwise determine the download_chunk_size. At step 804, the content transfer system determines the number of chunks of the object to be downloaded. According to one embodiment, the content transfer system calculates the number of chunks based on the download_chunk_size and object size. At step 806, the content transfer system determines the starting and ending offsets of each of the chunks to be downloaded.

The content transfer system can further determine a max_download_queue_size (step 808). As discussed above, the max_download_queue_size may be set in a configuration or by default in some embodiments. In other embodiments, the max_download_queue_size is a function of the download_chunk_size and a max_memory_size_for_download_chunking. Thus, determining the max_download_queue_size may include determining the max_memory_size_for_download_chunking. As discussed previously, max_memory_size_for_download_chunking may be specified in a user defined configuration, set based on a default upload chunk size or otherwise determined.

As indicated at 807, a chunk-task loop can be implemented to create chunk-tasks for chunks 1 . . . n. At step 810, the content transfer system checks the size of the download queue and, at step 812, determines if the download queue is full. For example, the content transfer system determines if the number of chunk-tasks in the download queue is greater than max_download_queue_size. Based on a determination that the download queue is full the content transfer system pauses creating new chunk-tasks until there is room in the download queue for a new chunk-task. Based on a determination that the upload queue is not full, the content transfer system creates a new chunk-task i (step 814). According to one embodiment, the chunk-task i includes the object identifier of the object to be downloaded (e.g., object number, such as a file number), a chunk identifier (e.g., a chunk number) for the respective chunk i to be downloaded, and the starting and ending offsets determined for chunk i in step 806.

At step 816, the chunk-task loop determines if the chunk-task i is the last chunk-task to be created for downloading the requested object (e.g., based on the number of chunks of the requested object determined in step 804 and the number chunk-tasks created for downloading the requested object). If chunk-task i is not the last chunk-task for downloading the requested object, chunk-task loop moves to the next chunk-task. If chunk-task i is the last chunk-task for downloading the requested object, creation of chunk-tasks for downloading the requested objects is complete.

FIG. 8 is provided by way of example. The steps of FIG. 8 may be performed in different orders, steps omitted, additional steps added and/or steps repeated.

Figure 9:
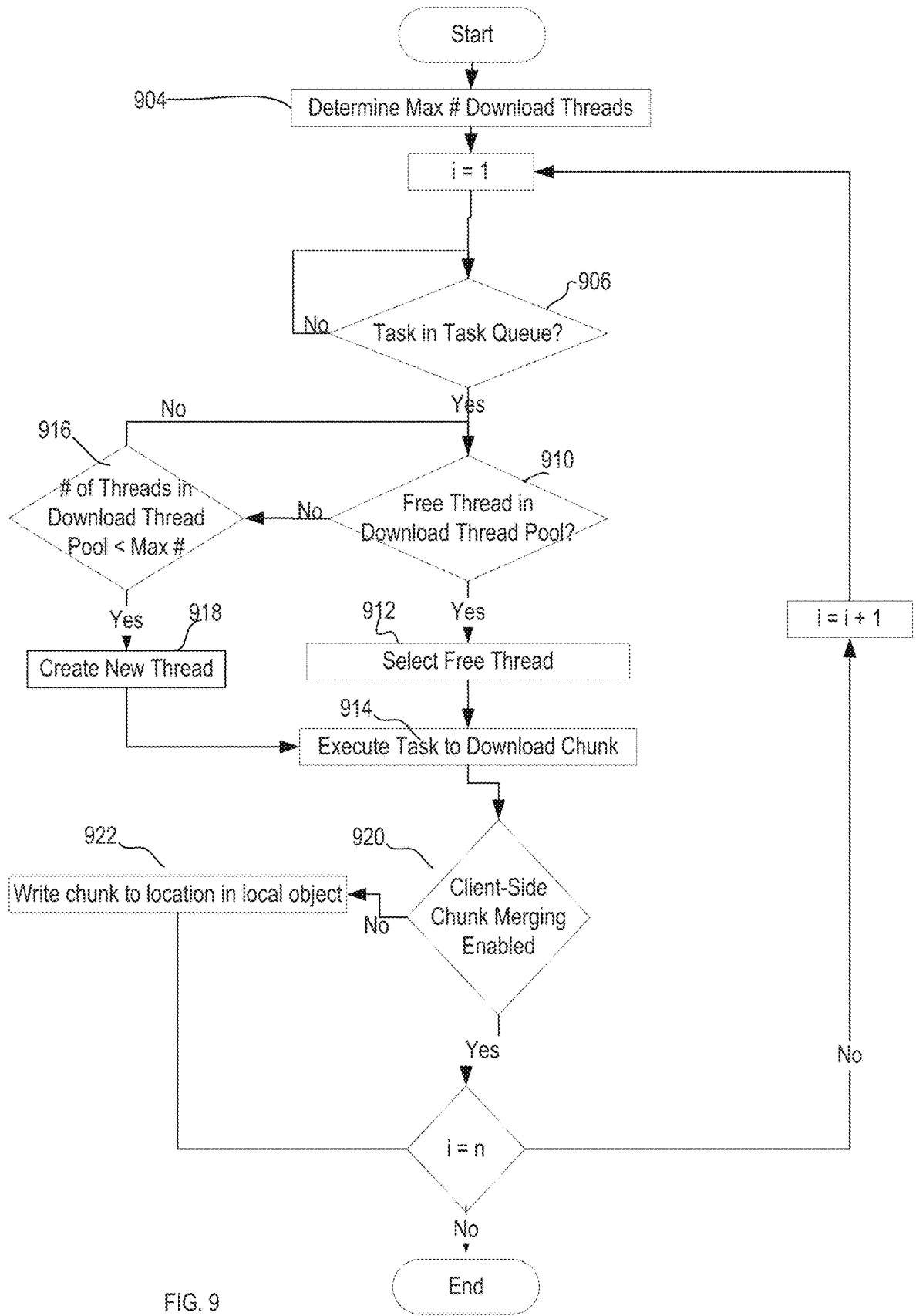
FIG. 9 is a flow chart illustrating one embodiment of a method for downloading a requested object from a data store.

FIG. 9 is a flow chart illustrating one embodiment of a method for downloading chunks of a requested object from a data store. FIG. 9 may represent one embodiment of steps 712, 716. One or more steps of FIG. 9 may be embodied as computer-executable instructions on a non-transitory computer-readable medium. One or more steps of FIG. 9 may be implemented by a content transfer system, such as but not limited to content transfer system 102 comprising a parallel download mechanism 602. Even more particularly, one or more steps of FIG. 9 may be implemented by a thread pool, such as thread pool 608.

According to one embodiment, the content transfer system determines the maximum number of threads allowed in the download queue (step 902). As discussed above, the max_download_threads may be set in a configuration or by default in some embodiments. In other embodiments, the max_download_threads value is a function of the download_chunk_size and a max_memory_size_for_download_chunking. Determining the max_download_threads may thus include determining the download_chunk_size and the max_memory_size_for_download_chunking.

At step 906, the content transfer system determines if there are any chunk-tasks available for processing in the download queue. If not, the content transfer system can wait until a chunk-task is available in the download queue for processing. If a chunk-task is available in the upload queue, the content transfer system determines if there is an available download thread in the download thread pool to process the chunk-task (step 910). If there is an available thread in the download thread pool, the content transfer system selects the available download thread from the download thread pool to process the chunk-task (step 912) and executes the selected thread to download the chunk specified in the chunk-task (step 914). According to one embodiment, the download thread requests, from the data store, the portion of the requested object's content specified in chunk-task, creates a respective byte stream object and reads the content returned by the data store in response to the request into the respective byte stream object.

Returning to step 910, if there is not a free download thread in the download thread pool to process an available chunk in the upload queue, the content transfer system can determine if a new thread should be created in the upload thread pool. According to one embodiment, the content transfer system determines if the number of threads in the upload thread pool has reached max_download_threads (step 916). If the number of threads in the upload thread pool is not less than max_download_threads, the content transfer system can wait until a download thread becomes available in the download thread pool to handle the available chunk-task. If the number of threads in the download thread pool is less than max_download_threads, the content transfer system adds a new download thread to the download thread pool (step 918) and executes the new download thread to download the chunk specified in the chunk-task (step 914).

At step 920, the content transfer system determines if client-side chunk merging is enabled. If so, the downloaded chunk is sent to the client for merging (see, FIG. 7). If client-side chunk merging is not enabled, the download thread writes the downloaded chunk to a local copy of the requested object (step 922). For example, if the requested object is a file, the download thread can write the chunk to a local copy of the file using the offsets specified in the chunk-task. The local copy of the file can be stored in a local file system at a predefined directory location and using the file identifier (e.g., file number determined for the requested object) as or in the filename. Thus, all download threads downloading chunks of the same requested file can write the chunks to the same file at the appropriate locations in the file. If the appropriate file does not exist, the download thread can create the file.

As indicated at step 930, the content transfer system can continue executing threads to process chunk-tasks to download all the chunks of the requested object. FIG. 9 is provided by way of example. The steps of FIG. 9 may be performed in different orders, steps omitted, additional steps added and/or steps repeated.

It will be appreciated that embodiments described herein may be implemented in a variety of systems. In some embodiments, a content transfer system may upload/download objects smaller than a threshold size using byte-by-byte content stream transfer and use parallel upload or parallel download for objects that meet the threshold size.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple database, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer-implemented method for efficient content transfer comprising:
   receiving a request from a client to upload a source object;
   receiving the source object;
   providing an upload queue;
   accessing a set of upload chunking parameters, the set of upload chunking parameters comprising a maximum chunk size and a maximum memory size for upload chunking;
   determining a maximum number of chunks that the upload queue can accommodate based on the maximum memory size for upload chunking and the maximum chunk size;
   executing a chunk creation loop to create a first plurality of chunks and add the first plurality of chunks to the upload queue, wherein the chunk creation loop is executable to:
      determine whether the upload queue is full based on whether a total number of chunks in the upload queue is less than the maximum number of chunks that the upload queue can accommodate;
      pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object;
   implementing an upload thread pool of upload threads, the upload thread pool configured to add a new upload thread to the upload thread pool based on a determination that an upload thread creation condition has been met;
   determining a maximum number of upload threads that the upload thread pool can accommodate based on the maximum memory size for upload chunking and the maximum chunk size;
   adding the new upload thread to the upload thread pool based on a determination that there is an available chunk in the upload queue, there is no free upload thread in the upload thread pool to process the available chunk, and a total number of upload threads in the upload thread pool is less than the maximum number of upload threads that the upload thread pool can accommodate; and executing the upload threads to upload the source object to a distributed data store, including executing the upload threads to upload chunks from the first plurality of chunks to the distributed data store in parallel.

2. The method of claim 1, further comprising:
associating each chunk of the first plurality of chunks with an object identifier to indicate that each chunk in the first plurality of chunks belongs to the same object;
assigning each chunk of the first plurality of chunks a respective chunk identifier to identify that chunk from other chunks in the first plurality of chunks; and
including the object identifier and the respective chunk identifier when uploading each chunk of the first plurality of chunks.

3. The method of claim 1, further comprising:
determining the maximum number of chunks that the upload queue can accommodate based on $$\text{max\_upload\_queue\_size} = \frac{\frac{1}{2}*(\text{max\_memory\_size\_for\_upload\_chunking})}{\text{upload chunk size}};$$

determining that the upload queue is not full if a total number of chunks in the upload queue is less than the maximum number of chunks that the upload queue can accommodate.

4. The method of claim 1, wherein the source object is received as a content stream and each chunk of the first plurality of chunks is created as a respective byte stream object.

5. The method of claim 1, further comprising:
receiving an object download request to download a requested object from the distributed data store;
determining a second plurality of chunks, each chunk in the second plurality of chunks comprising a respective portion of the requested object;
providing a download queue;
executing a chunk-task loop to create a plurality of chunk-tasks and add the plurality of chunk-tasks to the download queue, the chunk-task loop configured to pause creating the plurality of chunk-tasks based on a determination that the download queue is full and resume creating the plurality of chunk-tasks based on a determination that the download queue is not full, each chunk-task in the plurality of chunk-tasks specifying a respective chunk from the second plurality of chunks to download; and
providing a download thread pool comprising download threads, the download thread pool configured to add a new download thread to the download thread pool based on a determination that a download thread creation condition has been met;
executing the download threads to process the plurality of chunk-tasks from the download queue to download the requested object from the distributed data store, including executing the download threads to download chunks of the second plurality of chunks in parallel from the distributed data store.

6. The method of claim 5, further comprising:
associating each chunk of the second plurality of chunks with an object identifier to indicate that each chunk in the second plurality of chunks belongs to the same requested object;
associating each chunk of the second plurality of chunks with a respective chunk identifier to identify that chunk from other chunks in the second plurality of chunks;
determining a starting offset and an ending offset of each chunk in the second plurality of chunks; and
including in each chunk-task in the plurality of chunk-tasks, the object identifier, the respective chunk identifier for the respective chunk and the starting offset and the ending offset of the respective chunk.

7. The method of claim 6, writing each chunk of the second plurality of chunks to a corresponding position in a local file based on the starting offset and ending offset for that chunk.

8. The method of claim 5, further comprising:
determining a download chunk size;
determining a maximum memory size for download chunking;
determining a maximum number of chunks that the download queue can accommodate based on $$\text{max\_download\_queue\_size} = \frac{\frac{1}{2}*(\text{max\_memory\_size\_for\_download\_chunking})}{\text{download chunk size}};$$

and
determining that the download queue is not full based on a determination that a total number of chunks in the download queue is less than the maximum number of chunks that the download queue can accommodate.

9. The method of claim 8, further comprising:
determining a maximum number of download threads that the download thread pool can accommodate based on $$\text{max\_download\_threads} = \frac{\frac{1}{2}*(\text{max\_memory\_size\_for\_download\_chunking})}{\text{download chunk size}};$$

and
adding the new download thread to the download thread pool based on a determination that there is an available chunk in the download queue, there is no free download thread in the download thread pool to process the available chunk in the download queue, and a total number of download threads in the download thread pool is less than the maximum number of download threads that the download thread pool can accommodate.

10. A computer program product comprising a non-transitory computer-readable medium storing computer-readable instructions executable by a processor to:
receive a request from a client to upload a source object;
receive the source object;
provide an upload queue;
access a set of upload chunking parameters, the set of upload chunking parameters comprising a maximum chunk size and a maximum memory size for upload chunking;
determine a maximum number of chunks that the upload queue can accommodate based on the maximum memory size for upload chunking and the maximum chunk size;

implement a chunk creation loop to create a first plurality of chunks and add the first plurality of chunks to the upload queue, the chunk creation loop executable to:
    determine whether the upload queue is full based on whether a total number of chunks in the upload queue is less than the maximum number of chunks that the upload queue can accommodate; and
    pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object; and
provide an upload thread pool of upload threads executable to upload the first plurality of chunks to a distributed data store to upload the source object to the distributed data store, the upload threads executable to upload chunks from the first plurality of chunks in parallel, the upload thread pool configured to add a new upload thread to the upload thread pool based on a determination that an upload thread creation condition has been met, wherein the computer-readable instructions are executable to determine a maximum number of upload threads that the upload thread pool can accommodate based on the maximum memory size for upload chunking and the maximum chunk size, and wherein the upload thread creation condition comprises a presence of an available chunk in the upload queue, no free upload thread in the upload thread pool to process the available chunk, and a total number of upload threads in the upload thread pool being less than the maximum number of upload threads that the upload thread pool can accommodate.

11. The computer program product of claim 10, wherein the computer-readable instructions are executable to:
    associate each chunk of the first plurality of chunks with an object identifier to indicate that each chunk in the first plurality of chunks belongs to the same object;
    assign each chunk of the first plurality of chunks a respective chunk identifier to identify that chunk from other chunks in the first plurality of chunks; and
    include the object identifier and the respective chunk identifier when uploading each chunk of the first plurality of chunks.

12. The computer program product of claim 10, wherein the computer-readable instructions are executable to:
    determine the maximum number of chunks that the upload queue can accommodate based on $$\text{max\_upload\_queue\_size} = \frac{\frac{1}{2} * (\text{max\_memory\_size\_for\_upload\_chunking})}{\text{upload chunk size}};$$

determine that the upload queue is not full if a total number of chunks in the upload queue is less than the maximum number of chunks that the upload queue can accommodate; and
    determine that the upload queue is full if the number of chunks in the upload queue is equal to the maximum number of chunks that the upload queue can accommodate.

13. The computer program product of claim 10, wherein the source object is received as a content stream and each chunk of the first plurality of chunks is created as a respective byte stream object.

14. The computer program product of claim 10, wherein the computer-readable instructions are further executable to:
    receive an object download request to download a requested object from the distributed data store;
    determine a second plurality of chunks, each chunk in the second plurality of chunks comprising a respective portion of the requested object;
    provide a download queue;
    implement a chunk-task loop to create a plurality of chunk-tasks and add the plurality of chunk-tasks to the download queue, the chunk-task loop configured to pause creating the plurality of chunk-tasks based on a determination that the download queue is full and resume creating the plurality of chunk-tasks based on a determination that the download queue is not full, each chunk-task in the plurality of chunk-tasks specifying a respective chunk from the second plurality of chunks to download; and
    provide a download thread pool comprising download threads to execute the plurality of chunk-tasks from the download queue to download the second plurality of chunks from the distributed data store, the download threads executable to download chunks in the second plurality of chunks in parallel, the download thread pool configured to add a new download thread to the download thread pool based on a determination that a download thread creation condition has been met.

15. The computer program product of claim 14, wherein the computer-readable instructions are executable to:
    associate each chunk of the second plurality of chunks with an object identifier to indicate that each chunk in the second plurality of chunks belongs to the same requested object;
    associate each chunk of the second plurality of chunks with a respective chunk identifier to identify that chunk from other chunks in the second plurality of chunks;
    determine a starting offset and an ending offset of each chunk in the second plurality of chunks; and
    include in each chunk-task in the plurality of chunk-tasks, the object identifier, the respective chunk identifier for the respective chunk and the starting offset and the ending offset of the respective chunk from the second plurality of chunks.

16. The computer program product of claim 15, wherein the download threads are executable to write each chunk in the second plurality of chunks to a corresponding position based on the starting offset and ending offset for that chunk.

17. The computer program product of claim 14, wherein the computer-readable instructions are executable to:
    determine a download chunk size;
    determine a maximum memory size for download chunking;
    determine a maximum number of chunks that the download queue can accommodate based on $$\text{max\_download\_queue\_size} = \frac{\frac{1}{2} * (\text{max\_memory\_size\_for\_download\_chunking})}{\text{download chunk size}};$$

determine that the download queue is not full if a total number of chunks in the download queue is less than the maximum number of chunks that the download queue can accommodate; and determine that the download queue is full if the number of chunks in the download queue is equal to the maximum number of chunks that the download queue can accommodate.

18. The computer program product of claim 17, wherein the computer-readable instructions are executable to determine a maximum number of download threads that the download thread pool can accommodate based on $$\text{max\_download\_threads} = \frac{\frac{1}{2}*(\text{max\_memory\_size\_for\_download\_chunking})}{\text{download chunk size}};$$

and wherein the download thread creation condition comprises a presence of an available chunk in the download queue, no free download thread in the download thread pool to process the available chunk in the download queue, and a total number of download threads in the download thread pool being less than the maximum number of download threads that the download thread pool can accommodate.

19. A computer-implemented method for efficient content transfer comprising:

receiving a request from a client to upload a source object;
receiving the source object;
providing an upload queue;
accessing a set of upload chunking parameters, the set of upload chunking parameters comprising a maximum chunk size and a maximum memory size for upload chunking;
determining a maximum number of chunks that the upload queue can accommodate based on the maximum memory size for upload chunking and the maximum chunk size;
executing a chunk creation loop to create a first plurality of chunks and add the first plurality of chunks to the upload queue, wherein the chunk creation loop is executable to:
determine whether the upload queue is full based on whether a total number of chunks in the upload queue is less than the maximum number of chunks that the upload queue can accommodate;
pause creating the first plurality of chunks based on a determination that the upload queue is full and resume creating the first plurality of chunks based on a determination that the upload queue can accommodate an additional chunk of the first plurality of chunks, each chunk in the first plurality of chunks containing a respective portion of the source object;

implementing an upload thread pool of upload threads, the upload thread pool configured to add a new upload thread to the upload thread pool based on a determination that an upload thread creation condition has been met;

determining the maximum number of chunks that the upload queue can accommodate based on $$\text{max\_upload\_queue\_size} = \frac{\frac{1}{2}*(\text{max\_memory\_size\_for\_upload\_chunking})}{\text{upload chunk size}};$$

determining that the upload queue is not full if a total number of chunks in the upload queue is less than the maximum number of chunks that the upload queue can accommodate; and executing the upload threads to upload the source object to a distributed data store, including executing the upload threads to upload chunks from the first plurality of chunks to the distributed data store in parallel.

20. The method of claim 19, further comprising:
determining a maximum number of upload threads that the upload thread pool can accommodate based on $$\text{max\_upload\_threads} = \frac{\frac{1}{2}*(\text{max\_memory\_size\_for\_upload\_chunking})}{\text{upload chunk size}};$$

and adding the new upload thread to the upload thread pool based on a determination that there is an available chunk in the upload queue, there is no free upload thread in the upload thread pool to process the available chunk, and a total number of upload threads in the upload thread pool is less than the maximum number of upload threads that the upload thread pool can accommodate.

21. The method of claim 19, further comprising:
associating each chunk of the first plurality of chunks with an object identifier to indicate that each chunk in the first plurality of chunks belongs to the same object;
assigning each chunk of the first plurality of chunks a respective chunk identifier to identify that chunk from other chunks in the first plurality of chunks; and
including the object identifier and the respective chunk identifier when uploading each chunk of the first plurality of chunks.

22. The method of claim 19, wherein the source object is received as a content stream and each chunk of the first plurality of chunks is created as a respective byte stream object.

* * * * *